Jan. 20, 1970  H. G. HAHM  3,490,563
DISK BRAKE WITH NOISE-LIMITING BRAKESHOE
Filed Jan. 10, 1968  3 Sheets-Sheet 1

INVENTOR.
HEINZ G. HAHM
BY
Karl F. Ross
Attorney

Jan. 20, 1970  H. G. HAHM  3,490,563
DISK BRAKE WITH NOISE-LIMITING BRAKESHOE
Filed Jan. 10, 1968  3 Sheets-Sheet 2

FIG.18 FIG.20 FIG.19
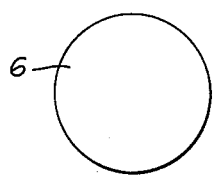 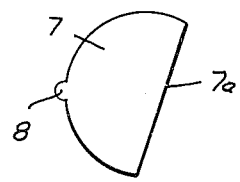

FIG.22
INVENTOR.
HEINZ G. HAHM
BY
Karl F. Ross
Attorney

Jan. 20, 1970     H. G. HAHM     3,490,563
DISK BRAKE WITH NOISE-LIMITING BRAKESHOE
Filed Jan. 10, 1968     3 Sheets-Sheet 3

INVENTOR.
HEINZ G. HAHM
BY
Karl G. Rosin
Attorney

United States Patent Office 3,490,563
Patented Jan. 20, 1970

3,490,563
DISK BRAKE WITH NOISE-LIMITING BRAKESHOE
Heinz Gunther Hahm, Frankfurt am Main, Germany, assignor to Alfred Teves G.m.b.H., Frankfurt am Main, Germany, a corporation of Germany
Filed Jan. 10, 1968, Ser. No. 696,847
Claims priority, application Germany, Jan. 20, 1967, T 33,029
Int. Cl. F16d 65/84, 65/12
U.S. Cl. 188—23                                    8 Claims

ABSTRACT OF THE DISCLOSURE

A brakeshoe adapted to limit noise generated by a disk brake wherein an intermediate plate, interposed between the backing plate of the brakeshoe and the piston, is affixed to the backing plate and provides force transmission between the piston and the backing plate which off center from the centrum of the disk-engaging surface of the brake lining, the force-transmitting portion consisting at least in part of a thermal insulator.

---

My present invention relates to anti-noise disk-brake assemblies and, more particularly, to a noise-limiting brakeshoe for use in such assemblies.

In my copending application Ser. No. 688,185, now Patent No. 3,442,356 I have pointed out that disk-type brakes offer considerable advantages over internal-expanding brakes for many automotive-vehicle applications. Thus, for example, the disk brake is more readily responsive to brake-pedal actuation of the master cylinder, provides a firmer engagement of the rotating surface, and requires a smaller stroke and less fluid displacement than most internal-expanding brakes. The disk brake generally comprises a rotating brake disk coupled with the vehicle wheel or axle and having a pair of annular braking faces lying in planes transverse to the axis of rotation of the disk. Flanking the disk, and juxtaposed with these annular braking faces over only a fraction of the disk surface, are a pair of brakeshoes which are of segmental configuration and engage only limited regions of the braking faces. Such brakeshoes are mounted in a yoke or housing which is connected to a nonrotatable portion of the vehicle, e.g. the axle housing or chassis, and are urged by respective wheel-brake pistons against the disk. To this end, wheel-brake cylinders are formed in the yoke and are connected by hydraulic lines with the master cylinder. In other modifications of this basic system, only a single wheel-brake cylinder is provided and either the disk or the yoke is axially shiftable or deflectable to bring the opposite face of the disk into engagement with a brakeshoe fixed on the yoke when the piston urges its brakeshoe against the disk.

In that application and in earlier, commonly assigned copending applications Ser. No. 601,013 filed Dec. 12, 1966 (now U.S. Patent No. 3,409,106 of Nov. 5, 1968) and Ser. No. 672,757 filed Oct. 4, 1967, now abandoned, it has been pointed out that the squealing noises and raucous sounds characteristic of the application of the disk brake appear to be related to the fact that the piston of earlier arrangements bears upon the braking plate of the brakeshoe in line with the center of gravity or centrum of the contact surface of the brake lining with the disk. These applications observe that a substantial reduction in the noise produced by the disk brake can be ensured by locating the contact zone of the piston and the backing plate of the brakeshoe somewhat off center with respect to the centrum of the contact face of the brake lining with the disk and, advantageously, ahead of the centrum in the direction of rotation of the disk, especially on the flange side of the yoke. The term "flange side" is used herein to designate that lobe or yoke half which is affixed to the axle housing, the other or "wheel side" lobe or yoke half being cantilevered from the flange-side yoke half and lying partly within the dished tire-carrying wheel disk. In the aforementioned application Ser. No. 672,757, a system for accomplishing this offsetting is described and comprises a thin intermediate plate having a bulge or protuberance engageable by the piston or bearing upon the backing plate, this intermediate plate being introduced to shift the location at which the piston acts upon the backing plate of the brakeshoe. In practice, it has been found that difficulties are encountered when the additional or intermediate plate is loosely disposed between the piston and the brakeshoe, even though this plate may be suspended from the yoke in a manner analogous to the suspension of the brakeshoe. The suspension means may include a pair of guide rods or pins bridging the yoke halves on opposite sides of the disk and lying just outwardly therefrom, the intermediate plate being coextensive with the backing plate of the brakeshoe and having, like the brakeshoe, a pair of lugs whose apertures slidably receive the pins. A disadvantage of the intermediate plate resides in the fact that, unless the yoke is modified, the intermediate plate must be formed from relatively thin sheet metal and tends to deform under the substantial hydraulically generated brake force. Furthermore, the plate can be lost easily when the brakeshoes are replaced and can also fall out of place if improperly suspended from the yoke.

It is the principal object of the present invention, therefore, to provide a disk-brake system which carries forward some of the principles originally disclosed in application Ser. No. 672,757 and eliminates the difficulties hitherto encountered with the use of loosely positioned intermediate plates.

A more specific object of this invention is to provide an improved noise-limiting brakeshoe assembly which can be used in existing disk-brake arrangements and which will obviate the problems encountered heretofore as described above.

In accordance with the basic feature of this invention, a brakeshoe for a disk-brake assembly comprises, in addition to a metallic backing plate to which the brake lining is bonded, an intermediate plate constructed to shift the zone of force application by the wheel-brake piston to a location offset from the centrum of the braking face of the lining, the intermediate plate being rigidly connected with the backing plate and also consisting of a metal (preferably sheet metal). I have discovered that a number of configurations of the backing plate and the intermediate plate rigidly connected therewith are possible. Thus the intermediate plate can be provided with a force-transmitting element extending transversely to the intermediate plate in the direction of the backing plate to engage the latter with surface contact, the contact surface having a centrum offset from the centrum of the brake lining; this element may receive an insulating layer or may be an insulating member of a width less than that of the plates, which are preferably coextensive. The insulating member, which is independent of the two plates, can be sandwiched between the latter to space them apart or may be guided in the intermediate plate. When the intermediate member is a plate, it may have a circular cutout or a cutout of arc-segmental configuration provided with the attaching means; the abutment member between the two plates may have the shape of a disk or segment passing through the cutouts. The abutment element may also be a formation provided upon the formation-carrying plate with a height greater than the thickness of this latter plate and turned away from or toward the backing plate of the brakeshoe. The element-support plate may be provided with the formation by cementing it to, sliding it onto or pressing it into the formation-support plate and may be composed of a synthetic resin or ceramic of low thermal conductivity. The insulating element may, moreover, extend over the greater part of the force-transfer zone between the piston and the backing plate of the brakeshoe and thus perform the dual function of limiting heat transfer and reducing noise. In any event, this force-transmitting element is of generally segmental shape cut off along a chord which is inclined with reference to the radial direction of the disk to enhance the dissymmetry of the contact zone with resultant suppression of acoustic vibrations.

The above and other objects, features and advantages of the present invention will become more readily apparent from the following description, reference being made to the accompanying drawing in which:

FIG. 18 is an elevational view of the insulating disk of FIGS. 1 and 2 prior to its insertion into the intermediate plates of FIGS. 11 and 15;

FIG. 19 is an elevational view of the insulating element of FIGS. 3 and 4 prior to its insertion into the intermediate plate of FIGS. 12 and 17;

FIG. 20 is a side-elevational view of the inserts of FIGS. 18 and 19;

FIG. 22 is an elevational view of the intermediate plate of FIGS. 5 and 6;

Figure 1:
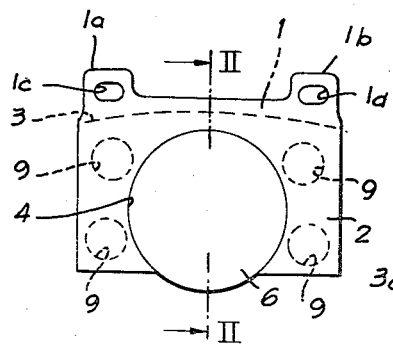
FIG. 1 is a rear-elevational view of a brakeshoe embodying the present invention.
Figure 2:
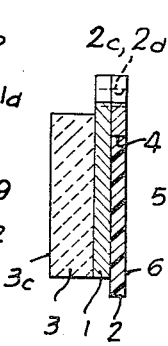
FIG. 2 is a cross-sectional view along the line II—II of FIG. 1.

In FIGS. 1 and 2, I show a brakeshoe for a disk-type brake of the general construction described in any of the aforementioned copending applications, which comprises a backing plate 1 and rectangular configuration with upstanding lugs 1a and 1b whose apertures 1c and 1d form guides by which the brakeshoe is suspended from the axially extending guide pins of the disk-brake yoke. A brake lining 3, here shown to be of arc-segmental shape and composed of a ceramic, is bonded to one side of the metallic backing plate 1 which can be composed of sheet metal (e.g. steel), steel plate or a light metal (e.g. aluminum). The plate 1 is formed with a plurality of openings 9 into which the brake-lining material extends to increase the bond between lining and backing plate. On the rear-surface of the backing plate 1, I dispose an auxiliary element-carrying plate 2 which may be spot-welded, roller-welded, resistance-welded or cold-bonded to the backing plate 1 by any conventional technique. This plate also may be composed of sheet or plate steel or light metal as described earlier. The plate 2 is coextensive with the plate 1 and has lugs 2a, 2b (see FIG. 11) whose apertures 2c and 2d register with apertures 1c and 1d of the backing plate 1 overlain by the intermediate plate 2. In addition, this intermediate plate is formed with a circular opening or cutout 4 into which an insulating abutment element 6 of complementary configuration is inserted, the element 6 being here of disk shape. The element 6 has a thickness (FIG. 2) equal to that of the plate 2 and is snugly received in the cutout 4, i.e. is fitted tightly into the latter, so that its piston-engaging rear flank (right-hand side of FIG. 2) is coplanar with the corresponding face of the intermediate plate 2.

Figure 3:
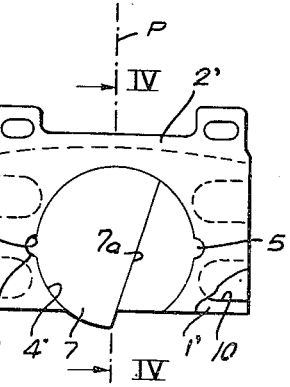
FIG. 3 is a view similar to FIG. 1 of another embodiment bearing upon one aspect of the invention.
Figure 4:
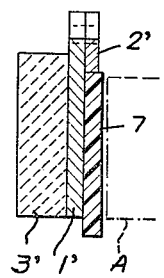
FIG. 4 is a cross-sectional view taken along the line IV—IV of FIG. 3.

A generally similar construction is employed in the brakeshoe of FIGS. 3 and 4 wherein, however, the backing plate 1', to which the lining 3' is bonded, is formed with a plurality of swallow-tail cutouts 10 open laterally of the plate and receiving the brake-lining material. In all of the embodiments described, the brake lining may be a ceramic.

In addition, the intermediate plate 2' has a generally circular cutout 4' which, at diametrically opposite locations, is provided with indentations 5 which augment the fixing of the insulating pressure member 7. When identations or other formations, such as that shown at 5, are used, the pressure member need not be a circular disk and can be as represented at 7 (FIGS. 3, 4 and 19), a segment of this disk founded by an edge 7a running askew to a median plane P through the opening 4'. In addition, the segmental pressure member 7, shown in FIG. 4 to have an axial thickness in the direction of brakeshoe movement which exceeds that of the intermediate plate 2', is provided with a tongue or protuberance 8 complementarily received in the indentation 5. It will be understood, of course, that while in the system of FIGS. 3 and 4, etc., the male formation 8 is shown to be part of the insulating body 7 and the female formation 5 part of the support plate 2', reversal is possible whereby a female formation (e.g. a recess) is provided along the periphery of member 7 and a male formation (e.g. a protuberance) is formed along the outline of the opening 4'. The disk or segmental-pressure members 6 and 7 may be composed of a material of high compressive strength and low thermal conductivity, preferably a synthetic resin (e.g. nylon) or a low-conductivity ceramic.

Figure 7:
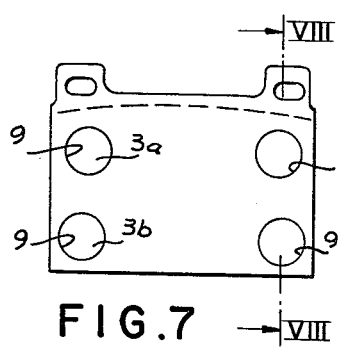
FIG. 7 is a rear-elevational view of the backing plate of the brakeshoe of FIG. 1, the intermediate plate having been removed.
Figures 8, 9:
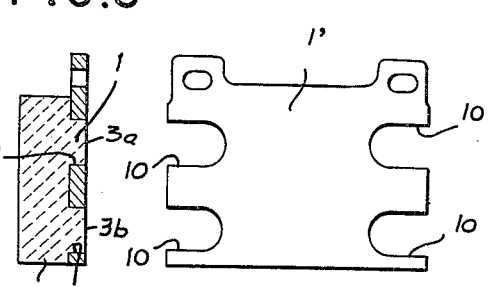
FIG. 8 is a cross-sectional view along the line VIII—VIII of FIG. 7.
FIG. 9 is an elevational view of the backing plate of FIG. 3.
Figure 10:
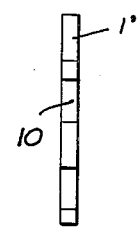
FIG. 10 is a slide-elevational view of this backing plate.

In FIGS. 7 and 8, the backing plate 1 is shown in its relationship to the lining 3, and from these views it is clear that the lining material projects at 3a and 3b into the apertures 9 disposed along the lateral edges of the backing plate to increase the bond of the lining to the backing plate. A similar increase in the bond can be provided with the backing plate 1' as illustrated in FIGS. 9 and 10 (and 30) wherein the outwardly open swallowtail cutout 10 receives portions of the lining material 3' as described in connection with FIGS. 3 and 4.

Figure 11:
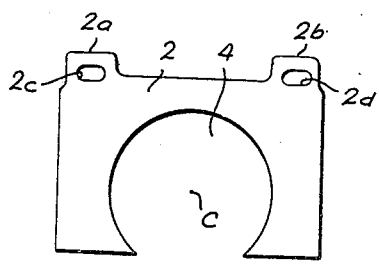
FIG. 11 is an elevational view of the intermediate plate of FIGS. 1 and 2.
Figure 13:
FIG. 13 is a side-elevational view of the plates of FIGS. 11 and 12.
Figure 12:
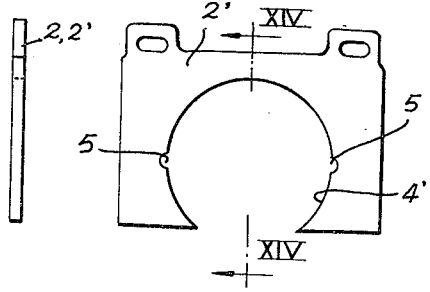
FIG. 12 is an elevational view of the intermediate plate of the embodiment of FIGS. 3 and 4.
Figure 14:
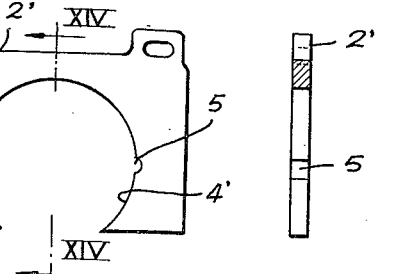
FIG. 14 is a cross-sectional view taken along the line XIV—XIV of FIG. 12.
Figure 15:
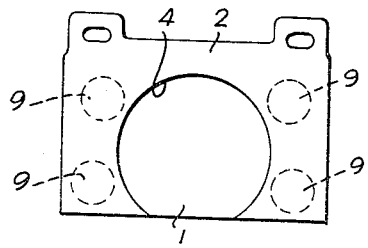
FIG. 15 is an elevational view of the backing and intermediate plates of FIGS. 1 and 2 upon bonding them together.
Figure 16:
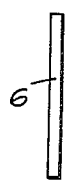
FIG. 16 is a side-elevational view of the plates of FIG. 15.
Figure 17:
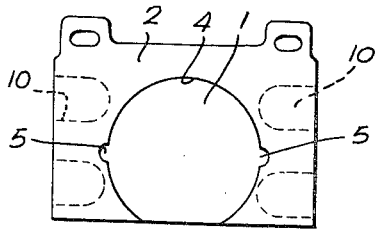
FIG. 17 is a view, similar to FIG. 15, of the plates of FIGS. 3 and 4.

FIGS. 11 and 13 show the intermediate element-carrying plate 2 prior to its attachment by welding to the backing plate 1. It will be apparent that the center of the cutout 4 (placed at C) is offset from the centrum of the disk-engaging face 3c of the lining (see FIG. 2). In general, the plate 2 will be applied to the backing plate 1 (FIGS. 15 and 16) prior to bonding the lining 3 to the backing plate 1, the disk 6 (FIGS. 18 and 20) being thereafter inserted. In an analogous manner, the backing plate 2' (FIGS. 12, 13 and 14) has its cutout 4' so positioned as to offset the effective region of the piston A (see FIG. 4). Here, too, the plate may be bonded to the bearing plate 1' (FIG. 17) prior to the attachment of the lining 3' to the latter, the insulating member 7 (FIGS. 19 and 20) being thereafter inserted. The elements 6 and 7 are mounted in the cutout 4 or 4' by press-fitting or cementing or by merely sliding them into place. While the element 6 has been shown to have the thickness of the plate 2 and element 7 to have a thickness greater than that of plate 2', it will be understood that the thickness of element 6 may exceed that of plate 2 while element 7 may have a thickness equal to that of plate 2'. Both elements 6 and 7 bear directly upon the backing plates 1 and 1' and are positively positioned by the respective support plates 2 and 2' so that they cannot be lost or shifted relatively to the backing plate. From FIG. 4, moreover, it is clear that the contact surface of the piston A is less than the cross-section of the circular cutouts 4 and 4'.

Figure 21:
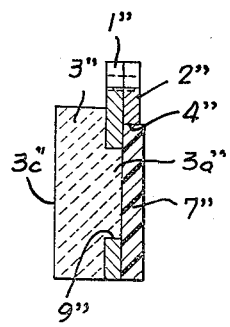
FIG. 21 is a view similar to FIG. 4 illustrating another embodiment of this invention.

The brake-lining material (see FIG. 21) may extend at 3a" from the brake lining 3" through an opening 9" in the backing plate 1", the opening 9" constituting a single aperture in the backing plate through which the brake-lining material passes. This opening 9" is located centrally in the plate 1" and thus is concentric with the centrum of the braking face 3c" of the lining. The auxiliary plate 2", which is welded to the backing plate 1" as previously described, has an opening 4" eccentric with respect to the opening 9" and receiving an insulating disk 7" (having the shape of element 7 shown in FIG. 19) which here bears directly on the brake lining 3". The piston acts against the element 7" and is insulated in a particularly effective manner from the friction heat developed at surface 3c". When the disks 7 or 7" are used, a smooth piston may be employed without any concern as to rotation of the piston.

Figure 5:
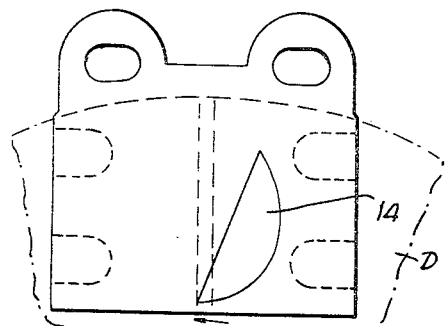
FIG. 5 is a rear-elevational view of still another brakeshoe in accordance with this invention.
Figure 6:
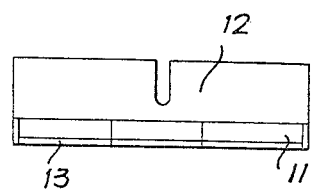
FIG. 6 is an end view of this latter brakeshoe from above.
Figure 23:
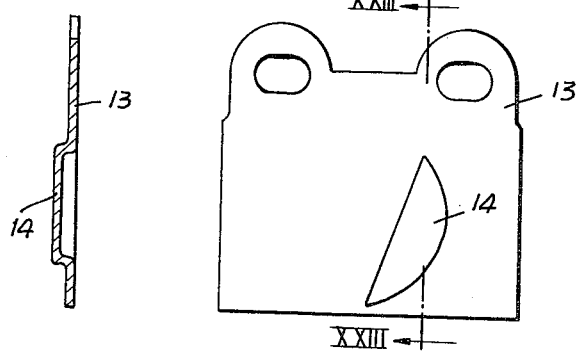
FIG. 23 is a cross-sectional view along the line XXIII—XXIII of FIG. 22.
Figure 24:
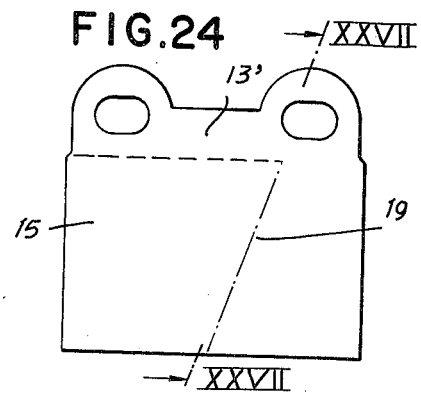
FIG. 24 is an elevational view of still another intermediate plate.
Figure 25:
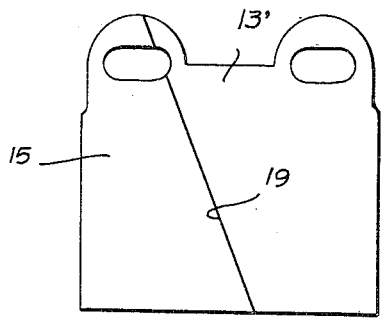
FIG. 25 shows the other side of this plate.
Figure 28:
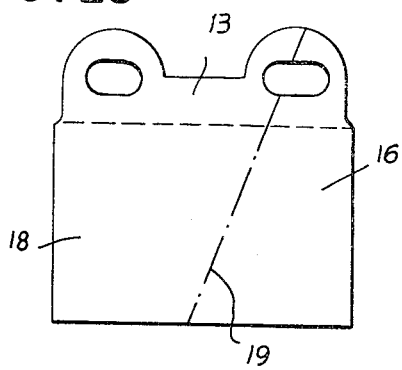
FIG. 28 is an elevational view of the plate of FIG. 27.
Figure 30:
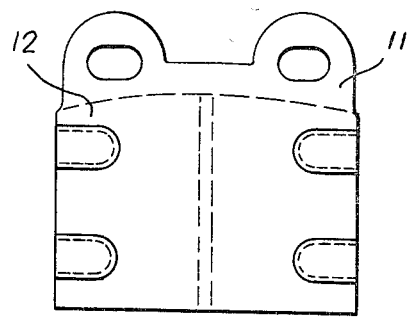
FIG. 30 is an elevational view of the backing plate of the embodiment of FIGS. 5 and 6.
Figure 26:
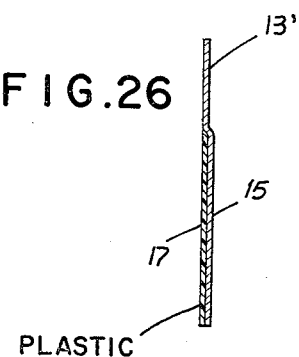
FIG. 26 is a cross-sectional view along the line XXVI—XXVI of FIG. 24.
Figure 27:
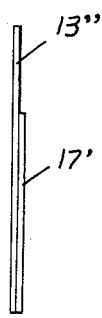
FIG. 27 is a side-elevational view of another intermediate plate illustrating the invention.
Figure 29:
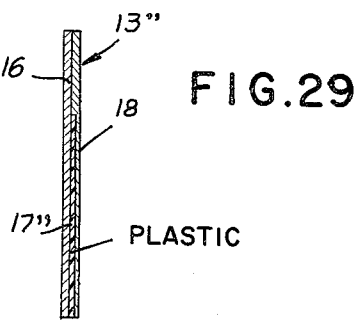
FIG. 29 is a cross-sectional view through a composite intermediate plate.

In FIGS. 5, 6 and 30, I show another embodiment of this invention wherein the backing plate 11 of the brakeshoe carries a lining 12 and, along its side opposite the lining, an intermediate plate 13 secured to the backing plate 11 by spot, roller or other resistance welding or by cold-welding. The intermediate plate 13 (see FIGS. 5 and 22) is shown to be provided with a bulge 14 of substantially segmental configuration and engageable by the piston. This bulge may be better seen in FIG. 23. The plate 13 is of course bonded to the backing plate 11 by the welding techniques previously described. In FIGS. 24 through 26, the intermediate plate 13' is formed with a step 15 which runs along the skew line 19 and is filled at 17 with a synthetic-resin plate as shown in FIG. 26. The synthetic-resin plate 17' may (FIG. 27) be mounted directly on the support plate 13" to form a step or else a pair of plates 16, 18 (FIGS. 28 and 29) may sandwich the synthetic-resin or vibrex plate 17" between them to form a carrier 13'" therefor.

The plates of FIGS. 1, 2, 28 and 29 are particularly desirable when stepped pistons are employed (see commonly assigned copending application Ser. No. 601,013 now U.S. Patent No. 3,409,106) while the embodiments of FIGS. 3 through 6, 21, 26 and 27 may be used when smooth-faces pistons are employed (see commonly assigned copending application Ser. No. 672,757). In addition, the brake lining 3, 3', etc. can be flush with the plates 1, 2 or 1', 2', etc. or may extend around these sides.

The invention described and illustrated is believed to admit of many modifications within the ability of persons skilled in the art.

I claim:
1. In a brake system including a brakeshoe, a rotating brake disk engageable by a face of said brakeshoe and a piston shiftable perpendicularly to said face to urge said brakeshoe against said disk, the improvement whereby said brakeshoe comprises a rigid backing plate extending generally parallel to said face, a brake lining secured to said backing plate and forming said face, and a force-transmitting element interposed between said piston and said backing plate; said element having the general shape of a circular segment with an arcuate boundary whose center of curvature lies substantially on a median line of said face extending radially of said disk whereby the centrum of said element is offset from the centrum of said face, said segment being cut off along a chord including an acute angle with said median line.

2. The improvement defined in claim 1 wherein said backing plate is provided with at least one throughgoing opening smaller than said element, said brake lining extending through said opening into contact with said element.

3. The improvement defined in claim 1 wherein said force-transmitting element is an insulating member of low thermal conductivity.

4. The improvement as defined in claim 1 wherein said element has a surface area engageable by said piston exceeding that of the piston in the region of its engagement with the brakeshoe.

5. The improvement defined in claim 1 wherein said brakeshoe further comprises an intermediate plate interposed between said backing plate and said brake lining, said intermediate plate being provided with a throughgoing opening of substantially circular configuration concentric with and of the same radius as said segment, said element being received in said opening.

6. The improvement defined in claim 5, further comprising interfitting formations on said element and said intermediate plate along said opening for limiting angular movement of said element in said opening.

7. The improvement as defined in claim 5 wherein said element has a thickness in the direction of movement of said brakeshoe at least equal to the thickness of said intermediate plate.

8. The improvement as defined in claim 7 wherein said element projects from said intermediate plate toward said piston.

References Cited

UNITED STATES PATENTS

| 3,113,643 | 12/1963 | Botterill | 188—73 |
| 3,190,397 | 6/1965 | Sudres. | |
| 3,298,468 | 1/1967 | Buyze | 188—73 |
| 3,378,116 | 4/1968 | Hennig. | |

MILTON BUCHLER, Primary Examiner

GEORGE E. A. HALVOSA, Assistant Examiner

U.S. Cl. X.R.

188—250, 264